United States Patent
Burke, Jr. et al.

(10) Patent No.: US 9,171,295 B2
(45) Date of Patent: Oct. 27, 2015

(54) NOT-CONNECTED PRODUCT DATA EXCHANGE VIA SYMBOLOGY

(71) Applicant: Xerox Corporation, Norwalk, CT (US)

(72) Inventors: Robert William Burke, Jr., Stanley, NY (US); Gerard Hendrik Kruijt, Breda (NL)

(73) Assignee: Xerox Corporation, Norwalk, CT (US)

( * ) Notice: Subject to any disclaimer, the term of this patent is extended or adjusted under 35 U.S.C. 154(b) by 291 days.

(21) Appl. No.: 13/632,638

(22) Filed: Oct. 1, 2012

(65) Prior Publication Data
US 2014/0091135 A1    Apr. 3, 2014

(51) Int. Cl.
G06F 17/00    (2006.01)
G06Q 10/00    (2012.01)
G06Q 30/06    (2012.01)

(52) U.S. Cl.
CPC ............... *G06Q 10/20* (2013.01); *G06Q 30/06* (2013.01)

(58) Field of Classification Search
None
See application file for complete search history.

(56) References Cited

U.S. PATENT DOCUMENTS

| | | | |
|---|---|---|---|
| 7,822,411 B2 * | 10/2010 | Nakatani | 455/420 |
| 8,982,391 B2 | 3/2015 | Burke, Jr. et al. | |
| 2004/0078721 A1 * | 4/2004 | Williams | 714/46 |
| 2006/0052055 A1 | 3/2006 | Rowse et al. | |
| 2008/0082430 A1 * | 4/2008 | Kamata | 705/30 |
| 2013/0278963 A1 * | 10/2013 | Hoarau et al. | 358/1.15 |

* cited by examiner

*Primary Examiner* — Michael G Lee
*Assistant Examiner* — Tabitha Chedekel
(74) *Attorney, Agent, or Firm* — Fox Rothschild LLP

(57) ABSTRACT

An electronic device, such as a print device, generates barcodes that contain encoded data corresponding to a functional destination and a variety of electronic device operational parameters. When a user selects a functional category, the electronic device determines the category's destination and relevant parameters, and generates the barcode with destination data and the parameters. A user may then use a barcode scanner to scan the barcode and automatically transmit the parameters to the destination.

19 Claims, 11 Drawing Sheets

NOT-CONNECTED PRODUCT DATA EXCHANGE VIA SYMBOLOGY

BACKGROUND

This document relates generally to systems and methods for performing document services using Mobile Communication Devices ("MCDs"), and more particularly, to systems and methods configured for providing non-connected product data exchange using barcode symbology and/or mobile technology.

In many service provider applications, electronic devices are placed in customer facilities. Such electronic devices include, but is not limited to, document handling devices, machinery, vehicles, heating/cooling units, water supply/quality meters, energy meters, and vending machines. The electronic devices are typically configured to collect information that is useful for billing purposes, supply ordering purposes, service ordering and diagnostic purposes. For example, a customer enters into a contract with a document service provider for document services (e.g., copying). In order to provide the document services, a multi-functional device is placed in a facility of the customer. The customer is charged by the document service provider based on the total number of copies made by the multi-functional device. As such, the multi-functional device tracks the number of copies made thereby. In order for the document service provider to prepare a bill, it needs to obtain the "page-related" information from the multi-functional device. This information may be identified by the type of operation performed against each page such as copy, print, fax or scan operations.

The "page-related" information can be obtained in many ways. If the multi-functional device is connected to a service provider system via the Internet, then the "page-related" information is communicated automatively from the multi-functional device to the document service provider over a communications link. However, if the multi-functional device is a non-connected machine (i.e., the multi-functional device is not connected to a service provider system via a network), then the "page-related" information is obtained by the document service provider via a manual process. The manual process typically involves: presenting the "page-related" information to a person via a display screen of the multi-functional device; manually writing the displayed information on a sheet of paper; and sending the written information to the document service provider via a fax, email or online form. The manual process is a relatively costly, inaccurate and error prone solution for obtaining data from a non-connected machine.

SUMMARY

Embodiments described in this document concern systems and methods for capturing operational information for a print device. The methods involve monitoring a plurality of operational parameters of the print device by a processor of the print device. Each of the operational parameters corresponds to at least one of a plurality of functional categories. A user selection is received via a user interface of the print device. The user selection corresponds to a first functional category of the plurality of functional categories. A subset of operational parameters are retrieved by the processor that corresponds to the first functional category. Thereafter, the processor: encodes data containing the subset of operational parameters into a barcode; and encodes destination data into the barcode. The destination data corresponds to a destination associated with the first functional category. The barcode is caused by the processor to be output via a readable medium. The readable medium may be: a display screen on which the barcode can be displayed; or a substrate on which the barcode can be printed.

In first embodiments, the first functional category comprises a machine configuration category. The subset of operational parameters comprises a print device identification code, a tray configuration parameter, a peripheral device identification code, and a print device setting. The destination data comprises a web address for a maintenance service.

In second embodiments, the first functional category comprises a meter read category. The subset of operational parameters comprises a number of impressions. The destination data comprises a web address for a document management financial tracking service.

In third embodiments, the first functional category comprises a consumable item category. The subset of operational parameters comprises a toner level. The destination data comprises a web address for a toner supplier.

In the third embodiments, the method further comprises: capturing, by a mobile electronic device, an image of the barcode; decoding, by the mobile electronic device, the barcode; transmitting, by the mobile electronic device, an electronic message comprising the toner level; and receiving, by the mobile electronic device, a response from the toner supplier indicating that a toner order is pending for the print device.

In fourth embodiments, the first functional category comprises a maintenance function. The subset of the operational parameters comprises a fault code and at least one print setting. The destination data comprises a web address for a maintenance service.

In the fourth embodiments, the method further comprises: capturing, by a mobile electronic device, an image of the barcode; decoding, by the mobile electronic device, the barcode; transmitting, by the mobile electronic device, an electronic message comprising the fault code and the print setting; and receiving, by the mobile electronic device, a response comprising repair instructions from the maintenance service.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
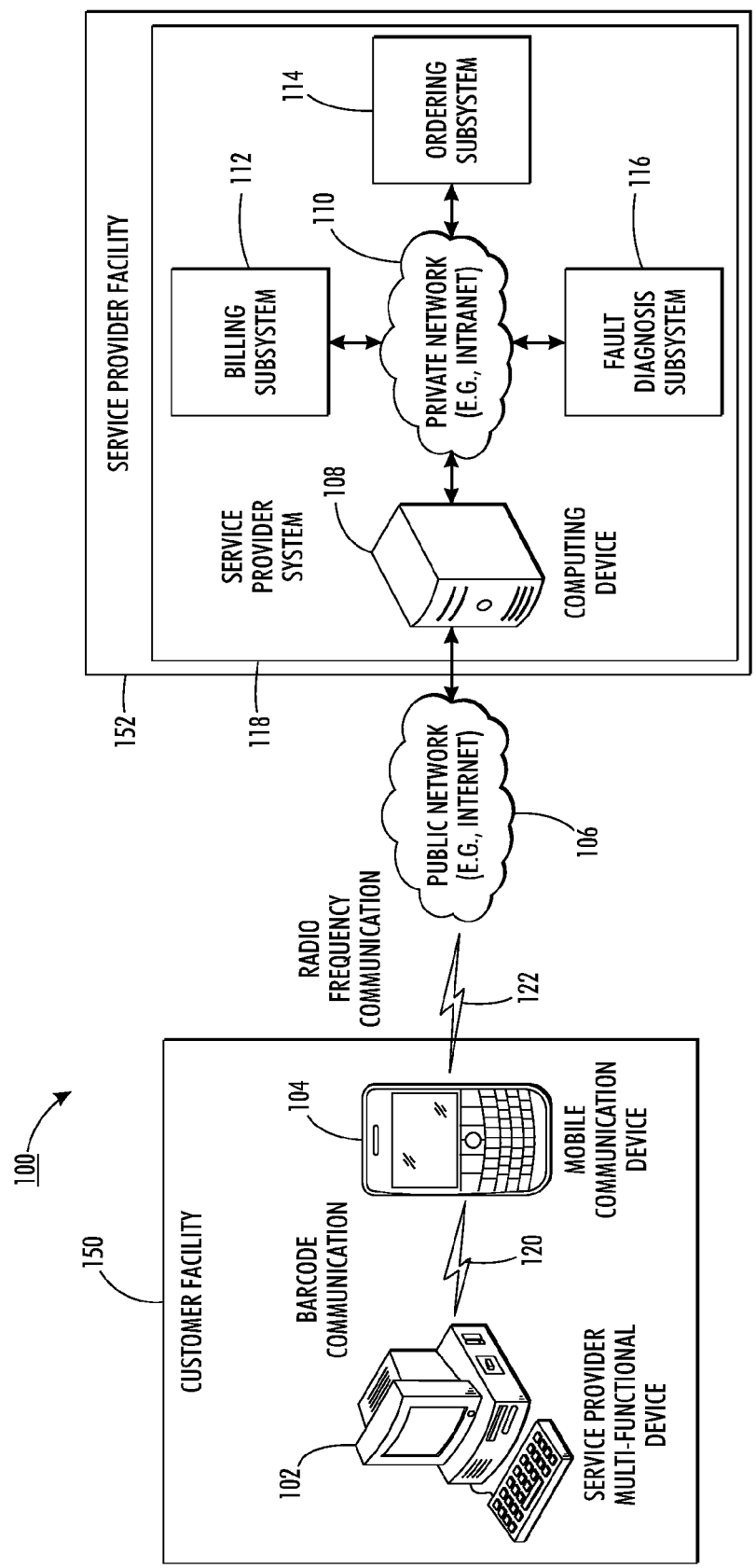
FIG. 1 is a schematic illustration of an example of a system configured to provide non-connected product data exchange via NFC, barcode and/or mobile technology.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The term "equipment", as used herein, refers to any electronic item that is provided to a customer by a service provider for a specific purpose. Such electronic items include, but are not limited to, printers, scanners, copiers, fax machines, multi-functional devices, machinery, vehicles, heating/cooling units, water supply/quality meters, energy meters, and vending machines. The terms "device" and "electronic device", as used herein, each refer to a tool used to perform a task. An example of a "device" or an "electronic device" is a printer for printing documents. The term "multi-functional device", as used herein, refers to a machine comprising hardware and associated software for printing, copying, facsimile transmitting or receiving, scanning, or performing other actions on document-based data. The term "multi-functional device", as used herein, also applies to other type of equipment comprising hardware and software for performing various tasks. For example, in some embodiments, the "other type of equipment" can include, but is not limited to, machinery, vehicles, heating/cooling units, water supply/quality meters, energy meters, and vending machines. A "print device" is a device that performs printing based on digital data, or a multi-functional device in which one of the functions is printing based on digital data.

Embodiments will now be described with respect to FIGS. 1-9. Embodiments generally relate to systems and methods for providing novel solutions to data exchange between computing systems and remotely located non-connected multi-functional devices. The term "non-connected multi-functional device", as used herein with respect to a given computing system, refers to a multi-functional device that is absent of a network interface and/or that is not connected to a given computing system via a network connection, and therefore is not network accessible to the given computing system. This does not necessarily mean that the multi-functional device is devoid of any network connection but rather that it has no network connection to a given computing system, such as that of a service provider facility. The multi-functional device can include, but is not limited to, printers, copiers, fax machines, machinery, vehicles, heating/cooling units, water supply/quality meters, energy meters, and vending machines. The novel solutions generally employ NFC technology, barcode technology and/or mobile technology to facilitate the data exchange between the computing systems and the remotely located non-connected multi-functional device. The particularities of how such technologies facilitate the provision of improved data exchange solutions will become evident as the discussion progresses. As a consequence of employing such technologies, the novel solutions are less costly, inaccurate and error prone as compared to conventional manual-based data exchange processes, such as that described above in the background section of this document.

Notably, the novel systems and methods are discussed herein in relation to document handling applications (e.g., printing applications). Embodiments of the present invention are not limited in this regard. The novel systems and methods can be used in a plurality of different applications. All that is necessary is that data must be obtained by a service provider from multi-functional device that is not network accessible to the service provider. As such, the novel systems and methods can additionally or alternatively be used in machinery/vehicle rental applications, transportation applications, heating/cooling applications, water supply applications, water quality testing applications, energy supply applications, and food/drink supply applications.

As used in this document, a "barcode" refers to a pattern or symbol that contained encoded data. Barcodes may include, for example, one-dimensional barcodes, two-dimensional barcodes (such as matrix codes, Quick Response ("QR") codes, Aztec codes and the like), or three-dimensional barcodes.

Referring now to FIG. 1, there is provided a schematic illustration of a system 100. The system 100 is generally configured to provide data exchange between computing systems and remotely located non-connected multi-functional device via NFC technology, barcode technology and/or mobile technology. In this regard, the system 100 comprises a Service Provider System ("SPS") 118 and Service Provider Multi-Functional Device ("SPMFD") 102 which are configured to facilitate the provision of various services to a customer. Such services can include, but are not limited to, document services (e.g., copying services, printing services, faxing services, and scanning services), water supply and sanitation services, energy services, vending services, heating and cooling services, and/or transportation services.

In the document services scenario, the SPMFD 102 may comprise a printer, a scanner, a copier, a fax machine, or a multi-functional device (as shown in FIG. 1) containing functions of any or all of such machines or equipment not listed here. For example, in some embodiments, the "other equipment" can include, but is not limited to, machinery, vehicles, heating/cooling units, water supply/quality meters, energy meters, and vending machines. A customer is charged by a Service Provider ("SP") based on the total number of copies/prints/faxes/scans made by the SPMFD 102. As such, the SPMFD 102 tracks the number of copies/prints/faxes/scans made thereby. In order for the SP to prepare a bill, it needs to obtain information from the SPMFD 102 specifying how many copies/prints/faxes/scans were made thereby during a given period of time (e.g., a day, a week, a month, or a year). The SP may also need to obtain other information from the SPMFD 102 for supply ordering purposes and diagnostic purposes.

As shown in FIG. 1, the SPMFD 102 resides in a facility 150 of the customer, and the SPS 118 resides in a facility 152 of the SP that is remote from the customer facility 150. Notably, in some embodiments, the SPMFD 102 is a non-connected multi-functional device, i.e., it is not directly communicatively connected to the SPS via a public network 106 (e.g., the Internet). Therefore, the requisite information can not be communicated automatically from the SPMFD 102 to the SPS 118 via a communications link established therebetween over the public network 106. However, the system 100 is designed to allow data exchange between the SPMFD 102 and the SPS 118 despite the lack of network connection to the SPMFD 102. In this regard, the system 100 implements novel methods for providing data exchange between the components 102, 118 thereof. Such novel methods will be described below in relation to FIGS. 4A-9. Still, it should be understood that the novel methods generally employ NFC technology, barcode technology and/or mobile technology to enable data exchanges between components 102, 118. Accordingly, the SPMFD 102 comprises an NFC-enabled and/or a barcode-enabled device.

During a data exchange process, the SPMFD 102 exchanges data with an MCD 104 via a barcode or near field communication 120. Barcode and near field communications are well known in the art, and therefore will not be described in detail herein. Still, it should be understood that a barcode communication is achieved using a barcode and a barcode scanner/reader. Barcode scanners/readers are well known in the art. Any known or to be known barcode scanner/reader can be used herein without limitation. A near field communication is a short-range wireless communication between devices over a relatively small distance (e.g., N centimeters or N inches, where N is an integer such as twelve). The near field communication may be established by touching devices together or bringing them into close proximity such that an inductive coupling occurs between inductive circuits thereof. In some embodiments, the near field communication operates at 13.56 MHz and at rates ranging from 106 kbit/s to 848 kbit/s. In some embodiments, the near field communications are achieved using NFC transceivers configures to enable contactless communication at 13.56 MHz. NFC transceivers are well known in the art. Any such known or to be known NFC transceiver can be used herein without limitation.

In turn, the MCD 104 communicates all or a portion of the exchanged data with the SPS 118 via a public network 106 (e.g., the Internet or a mobile phone network). The SPS 118 may also communicate response messages to the MCD 104 via public network 106 and RF communications 122. RF and public network communications are well known in the art, and therefore will not be described in detail herein.

At the SPS 118, the exchanged data may be processed for various reasons. In this regard, the exchanged data may be received at a computing device 108 of the SPS 118 and forwarded thereby to a sub-system via a private network 110 (e.g., an Intranet). For example, the exchanged data can be forwarded to and processed by a billing sub-system 112 to generate a bill, an ordering-subsystem 114 to place orders for supplies, and/or a fault diagnosis sub-system 116 to identify device faults.

Figure 2:
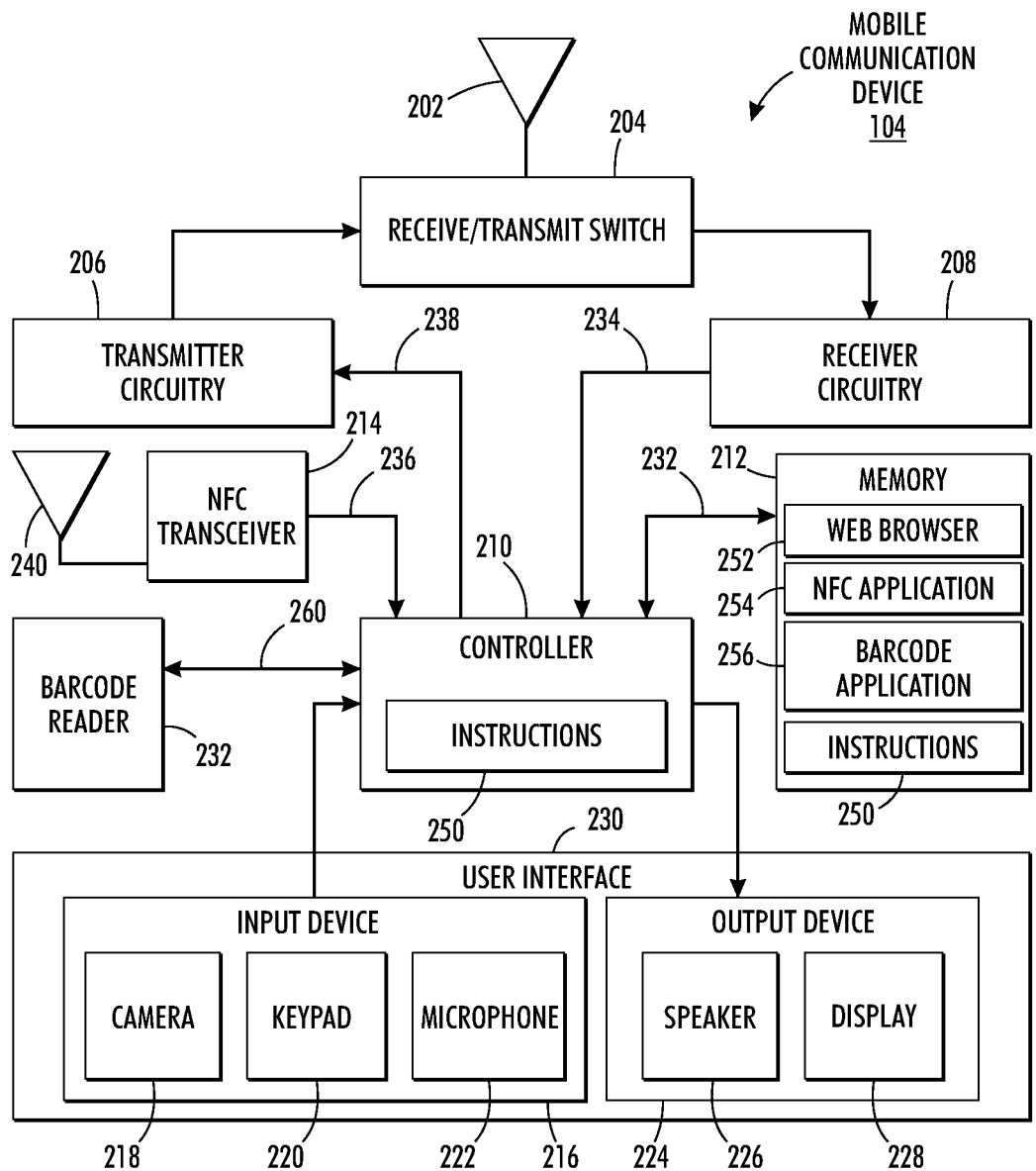
FIG. 2 is a schematic illustration of an architecture for a mobile communication device which is NFC-enabled and barcode-enabled.

Referring now to FIG. 2, there is provided a more detailed block diagram of one embodiment of an MCD 104. MCD 104 may include more or less components than those shown in FIG. 2. However, the components shown are sufficient to disclose an illustrative embodiment implementing the present invention. Some or all of the components of the MCD 104 can be implemented as hardware, software and/or a combination of hardware and software. The hardware includes, but is not limited to, one or more electronic circuits.

The hardware architecture of FIG. 2 represents one embodiment of a representative MCD 104 configured to facilitate the data exchange between SPMFD 102 and SPS 118 via NFC technology, barcode technology and/or mobile technology. In this regard, MCD 104 comprises an antenna 202 for receiving and transmitting RF signals. A receive/transmit ("Rx/Tx") switch 204 selectively couples the antenna 202 to the transmitter circuitry 206 and receiver circuitry 208 in a manner familiar to those skilled in the art. The receiver circuitry 208 demodulates and decodes the RF signals received from a network (e.g., the network 106 of FIG. 1). The receiver circuitry 208 is coupled to a controller (or microprocessor) 210 via an electrical connection 234. The receiver circuitry 208 provides the decoded signal information to the controller 210. The controller 210 uses the decoded RF signal information in accordance with the function(s) of the MCD 104.

The controller 210 also provides information to the transmitter circuitry 206 for encoding and modulating information into RF signals. Accordingly, the controller 210 is coupled to the transmitter circuitry 206 via an electrical connection 238. The transmitter circuitry 206 communicates the RF signals to the antenna 202 for transmission to an external device (e.g., a node of a public network 106 of FIG. 1) via the Rx/Tx switch 204.

An antenna 240 may be coupled to an NFC transceiver 214 for receiving NFC signals. NFC transceivers are well known in the art, and therefore will not be described in detail herein. However, it should be understood that the NFC transceiver 214 processes the NFC signals to extract information therefrom. The NFC transceiver 214 may process the NFC signals in a manner defined by the NFC application 254 installed on the MCD 104. The NFC application 254 can include, but is not limited to, a Commercial Off The Shelf ("COTS") application. The NFC transceiver 214 provides the extracted information to the controller 210. As such, the NFC transceiver 214 is coupled to the controller 210 via an electrical connection 236. The controller 210 uses the extracted information in accordance with the function(s) of the MCD 104. For example, the extracted information can be used by the MCD 104 to determine a Uniform Resource Locator ("URL") pointing to a web-based service provided by the SPS 118, and/or to initiate the launching of a web browser 252 and/or a proprietary service application (not shown) or fed to a listening proprietary service application installed thereon.

The controller 210 stores the extracted information in a memory 212 of the MCD 128. Accordingly, the memory 212 is connected to and accessible by the controller 210 through an electrical connection 232. The memory 212 may be a volatile memory and/or a non-volatile memory. For example, the memory 212 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 212 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure. The memory 212 can also be used to store various other types of information therein, such as authentication information, cryptographic information, location information and various service-related information (e.g., other pre-selected URLs).

The MCD 104 also may comprise a barcode reader 232. Barcode readers are well known in the art, and therefore will not be described in detail herein. However, it should be understood that the barcode reader 232 is generally configured to scan a barcode and process the scanned barcode to extract information therefrom. The barcode reader 232 may process the barcode in a manner defined by the barcode application 256 installed on the MCD 104. Additionally, the barcode scanning application can use the MCD camera to capture the barcode image for processing. The barcode application 256 can include, but is not limited to, a Commercial Off The Shelf ("COTS") application. The barcode reader 232 provides the extracted information to the controller 210. As such, the barcode reader 232 is coupled to the controller 210 via an electrical connection 260. The controller 210 uses the extracted information in accordance with the function(s) of the MCD 104. For example, the extracted information can be used by the MCD 104 to determine a Uniform Resource Locator ("URL") pointing to a web-based service provided by the SPS 118, and/or to initiate the launching of a web browser 252 and/or a proprietary service application (not shown) or fed to a listening proprietary service application installed thereon. The controller 210 may also store the extracted information in memory 212 of the MCD 128.

As shown in FIG. 2, one or more sets of instructions 250 are stored in the memory 212. The instructions 250 may include customizable instructions and non-customizable instructions. The instructions 250 can also reside, completely or at least partially, within the controller 210 during execution thereof by MCD 104. In this regard, the memory 212 and the controller 210 can constitute machine-readable media. The term "machine-readable media", as used here, refers to a single medium or multiple media that stores one or more sets of instructions 250. The term "machine-readable media", as used here, also refers to any medium that is capable of storing, encoding or carrying the set of instructions 250 for execution by the MCD 104 and that causes the MCD 104 to perform one or more of the methodologies of the present disclosure.

The controller 210 is also connected to a user interface 230. The user interface 230 is comprised of input devices 216, output devices 224 and software routines (not shown in FIG. 2) configured to allow a user to interact with and control software applications (e.g., application software 252-256 and other software applications) installed on the MCD 104. Such input and output devices may include, but are not limited to, a display 228, a speaker 226, a keypad 220, a directional pad (not shown in FIG. 2), a directional knob (not shown in FIG. 2), a microphone 222 and a camera 218. The display 228 may be designed to accept touch screen inputs. As such, user interface 230 can facilitate a user-software interaction for launching applications (e.g., application software 252-256) installed on the MCD 104. The user interface 230 can facilitate a user-software interactive session for writing data to and reading data from memory 212.

The display 228, keypad 220, directional pad (not shown in FIG. 2) and directional knob (not shown in FIG. 2) can collectively provide a user with a means to initiate one or more software applications or functions of the MCD 104. The application software 254 can facilitate the data exchange between an SPMFD (e.g., SPMFD 102 of FIG. 1) and an SPS (e.g., SPS 118 of FIG. 1). In this regard, the application software 254 performs one or more of the following: verify an identity of a user of the MCD 104 via an authentication process; present information to the user indicating that her/his identity has been or has not been verified; communicate information to an external device (e.g., SPMFD 102 of FIG. 1) indicating that a user's identity has been or has not been verified; receive a data string from the external device (e.g., SPE 102 of FIG. 1); process the received data string to obtain a URL, a devicet identifier and/or device data therefrom; automatically launch a web browser 252 or a proprietary service application (not shown) in response to the reception of the data string; access a server of an SPS (e.g., SPS 118 of FIG. 1) using the previously launched web browser 252 or a proprietary service application, and a URL (e.g., the URL obtained from the data string or another URL pre-stored in memory 212); automatically communicate the device identifier and/or device data to a computing device of an SPS (e.g., computing device 108 of FIG. 1); and/or receive response messages from the computing device of the SPS.

The application software 256 can also facilitate the data exchange between an SPMFD (e.g., SPMFD 102 of FIG. 1) and an SPS (e.g., SPS 118 of FIG. 1). In this regard, the application software 256 performs one or more of the following: verify an identity of a user of the MCD 104 via an authentication process; present information to the user indicating that her/his identity has been or has not been verified; communicate information to an external device (e.g., SPMFD 102 of FIG. 1) indicating that a user's identity has been or has not been verified; scan a barcode presented by the external device (e.g., SPMFD 102 of FIG. 1); process the barcode to obtain a URL, an device identifier and/or device data therefrom; automatically launch a web browser 252 or a proprietary service application (not shown) in response to the reception of the barcode; access a server of an SPS (e.g., SPS 118 of FIG. 1) using the previously launched web browser 252 or a proprietary service application and a URL (e.g., the URL obtained from the data string or another URL pre-stored in memory 212); automatically communicate the device identifier and/or device data to a computing device of an SPS (e.g., computing device 108 of FIG. 1); and/or receive response messages from the computing device of the SPS.

Figure 3:
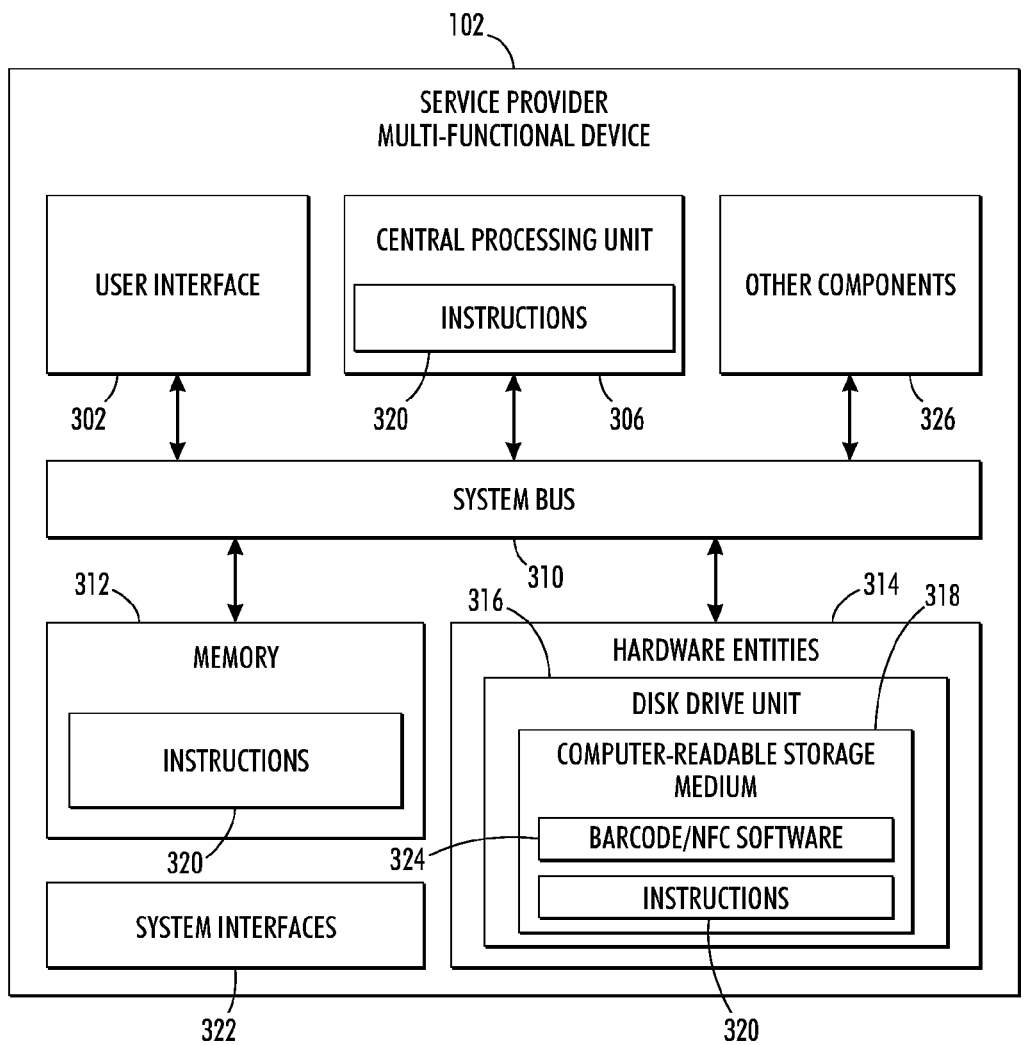
FIG. 3 is a schematic illustration of an architecture for service provider multi-functional device.

Referring now to FIG. 3, there is provided a detailed block diagram of the SPMFD 102. Some or all of the components of the SPMFD 102 can be implemented as hardware, software and/or a combination of hardware and software. The hardware includes, but is not limited to, one or more electronic circuits.

The SPMFD 102 may include more or less components than those shown in FIG. 3. However, the components shown are sufficient to disclose an illustrative embodiment implementing the present invention. The hardware architecture of FIG. 3 represents one embodiment of a representative SPMFD configured to facilitate the data exchange between SPMFD 102 and SPS 118 via NFC technology, barcode technology and/or mobile technology. As such, the SPMFD 102 of FIG. 3 implements at least a portion of improved methods for the data exchange between SPMFDs and SPSs in accordance with various embodiments.

As shown in FIG. 3, the SPMFD 102 includes a system interface 322, a user interface 302, a Central Processing Unit ("CPU") 306, a system bus 310, a memory 312 connected to and accessible by other portions of the SPMFD 102 through system bus 310, and hardware entities 314 connected to system bus 310. The user interface comprises a display, or other communication medium, associated with the SPMFD 102, whether mounted on the equipment or otherwise; and any software, resident at any location, that influences what is displayed or communicated at any time. At least some of the hardware entities 314 perform actions involving access to and use of memory 312, which can be a RAM, a disk driver and/or a Compact Disc ROM ("CD-ROM").

System interface 322 allows the SPMFD 102 to communicate directly or indirectly with external communication devices (e.g., MCD 104 of FIG. 1). If the SPMFD 102 is communicating indirectly with the external communication device, then the SPMFD 102 is sending and/or receiving a near field communication, and/or having a barcode scanned therefrom.

Hardware entities 314 can include a disk drive unit 316 comprising a computer-readable storage medium 318 on which is stored one or more sets of instructions 320 (e.g., software code) configured to implement one or more of the methodologies, procedures, or functions described herein. The instructions 320 can also reside, completely or at least partially, within the memory 312 and/or within the CPU 306 during execution thereof by the SPMFD 102. The memory 312 and the CPU 306 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the SPMFD 102 and that cause the SPMFD 102 to perform any one or more of the methodologies of the present disclosure.

In some embodiments of the present invention, the hardware entities 314 include an electronic circuit (e.g., a processor) programmed for facilitating the data exchange between itself and an SPS (e.g. SPS 118 of FIG. 1) via NFC technology, barcode technology and/or mobile technology. In this regard, it should be understood that the electronic circuit can access and run barcode and/or NFC software 324 and other types of software installed on the SPMFD 102. The barcode and/or NFC software 324 is operative to monitor operational parameters of the SPMFD 102 which correspond to a plurality of functional categories. The operational parameters can include, but are not limited to, billing parameters, meter parameters, supply item usage parameters, device fault parameters, diagnostic/maintenance parameters, and/or device configuration parameters. The term "billing parameters", as used herein, refers to parameters that are useful for billing purposes. The terms "meter parameters" and "supply usage parameters", as used herein, refer to parameters specifying consumption by a customer. The term "device fault parameters", as used herein, refers to parameters specifying a quality of service provided by an electronic device or a quality of a product output by the electronic device. The term "diagnostic/maintenance parameters", as used herein, refers to parameters useful for diagnosing operational faults of an electronic device and/or useful for maintaining or servicing the electronic device. The term "device configuration parameters", as used herein, refers to parameters defining operational settings of an electronic device.

In document handling embodiments, the billing parameters can include total number of impressions, total number black impressions, total number of black copied impressions, total number of black printed impressions, and/or total number of colored impressions. The supply item usage parameters can include ink level, toner level, supply item usage, estimated pages remaining, and/or estimated days remaining. The device fault parameters can include image quality parameters. The diagnostic/maintenance parameters can include estimated process duration parameters, fault code parameters, and/or device setting parameters. The device configuration parameters can include device identification parameters, tray configuration parameters, peripheral device identification parameters, peripheral device configuration parameters, and device setting parameters. The functional categories can include, but are not limited to, a machine configuration category, a software/network configuration category, a service activity category, a consumable item category, a supply usage category, a shipping address category, a meter read category, a billing category, a tool category, a maintenance category, and/or any other category relating to the operations/characteristics of the multi-functional device.

The barcode and/or NFC software 324 performs one or more of the following: receive a user input selecting one or more functional categories of the SPMFD 102 for which information is to be viewed by the user; retrieving information specifying a subset of the operational parameters that corresponds to the selected functional categories; display the retrieved information to a user of the SPMFD 102; display instructions to open an NFC software application installed on an MCD (e.g., MCD 104 of FIG. 1) and/or to place the MCD adjacent to an NFC interface 322 thereof; verify an identity of a user of the MCD via an authentication process; present information to the user indicating that her/his identity has been or has not been verified; dynamically generate a data string comprising a data corresponding to a destination (e.g., a web address or URL for a maintenance service, a document management financial tracking service, or an item supplier), a device identifier and/or device data (i.e., all or a portion of the previously retrieved information specifying a subset of the operational parameters that corresponds to the one or more selected functional categories); encrypt all or a portion of the data string; dynamically generate a barcode for the data string; outputting the barcode on a readable medium (e.g., display the barcode on a display screen or print the barcode onto a substrate); and communicate the data string to an external device (e.g., the MCD 104 of FIG. 1) via a near field communication. Techniques for generating a barcode are well known in the art. Any known or to be known method for generating a barcode can be used herein without limitation.

Figure 4A:
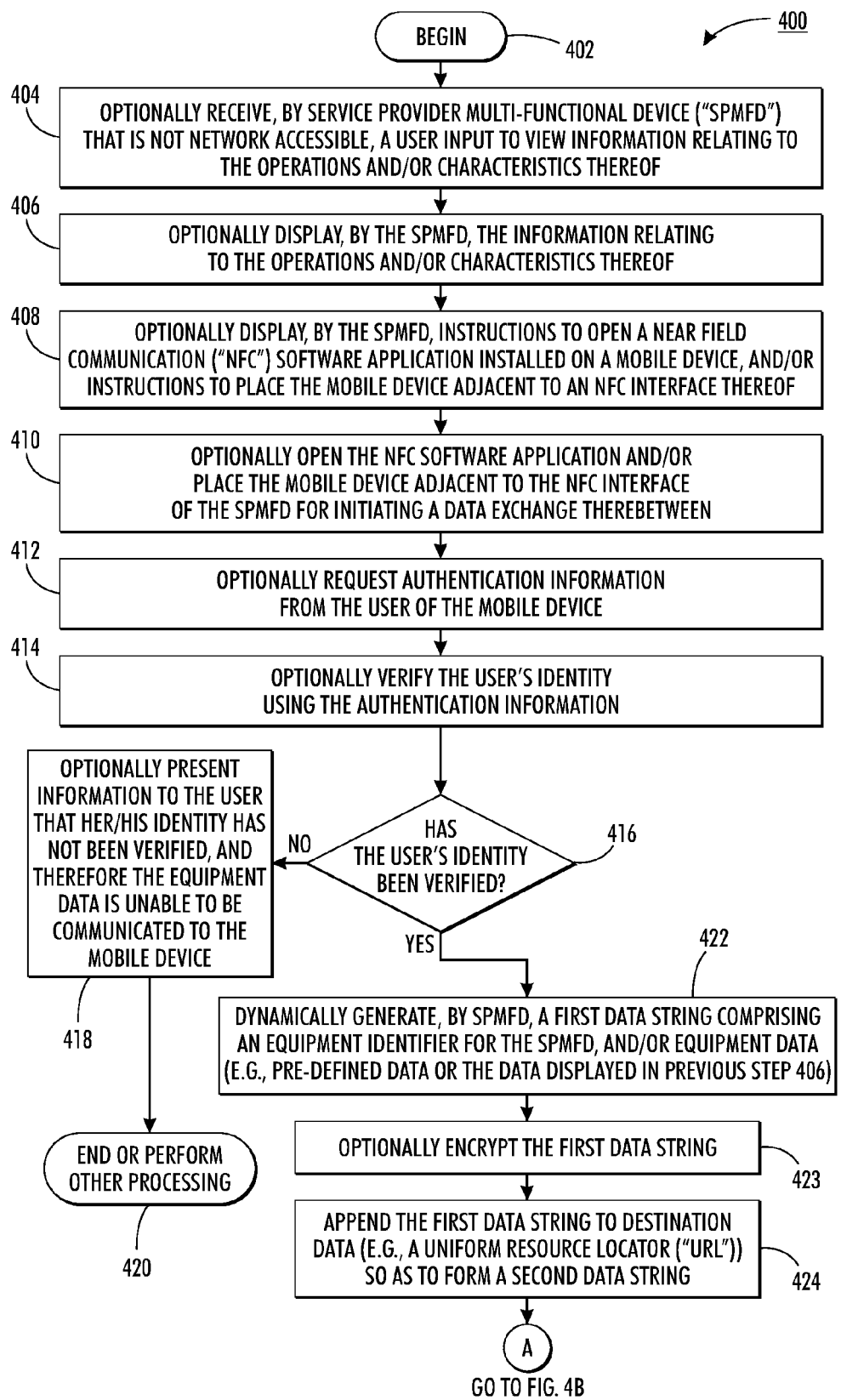
FIGS. 4A-4B collectively provide a flow diagram of a method for providing non-connected product data exchange via NFC and mobile technologies.
Figure 4B:
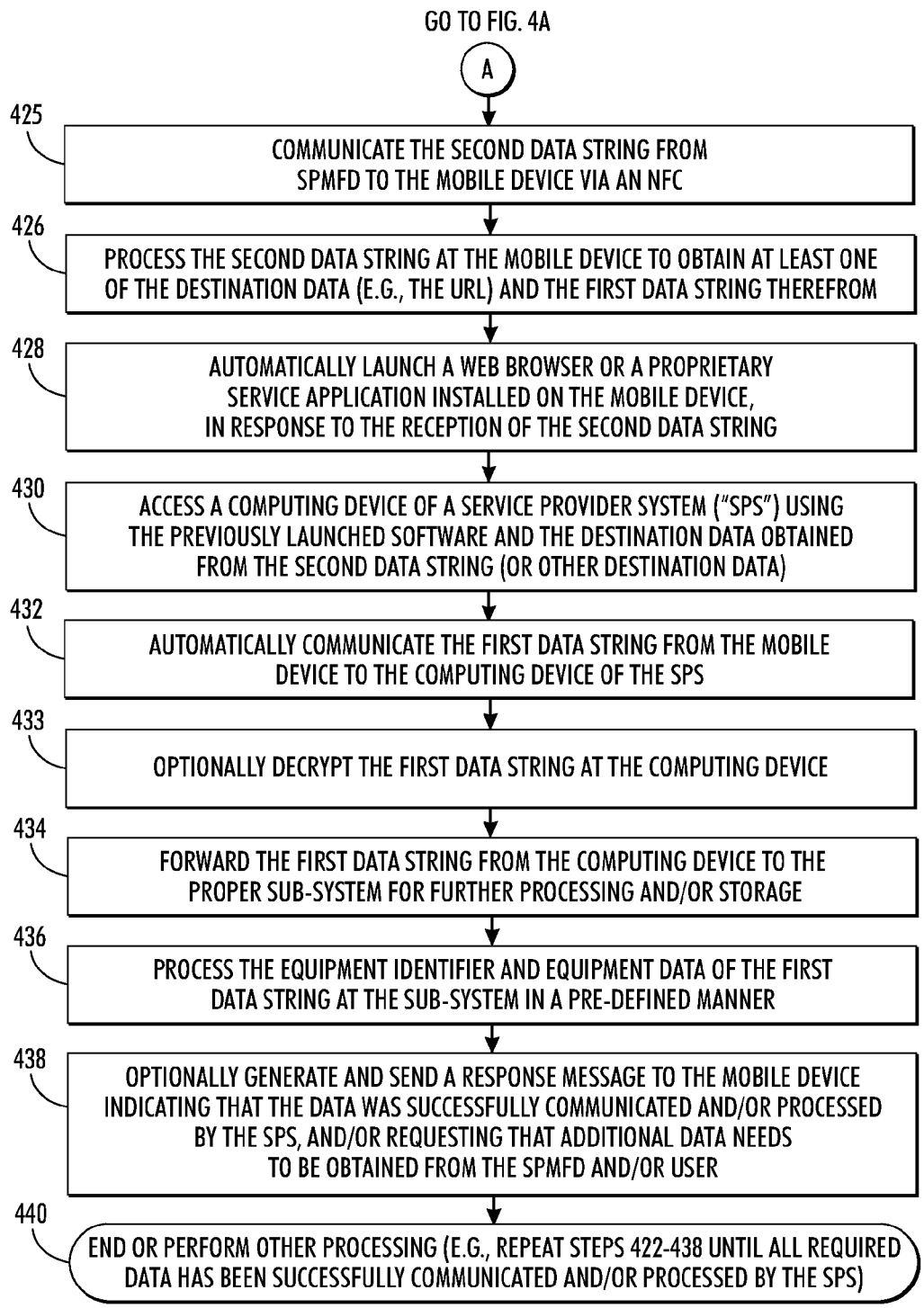
Figure 5:
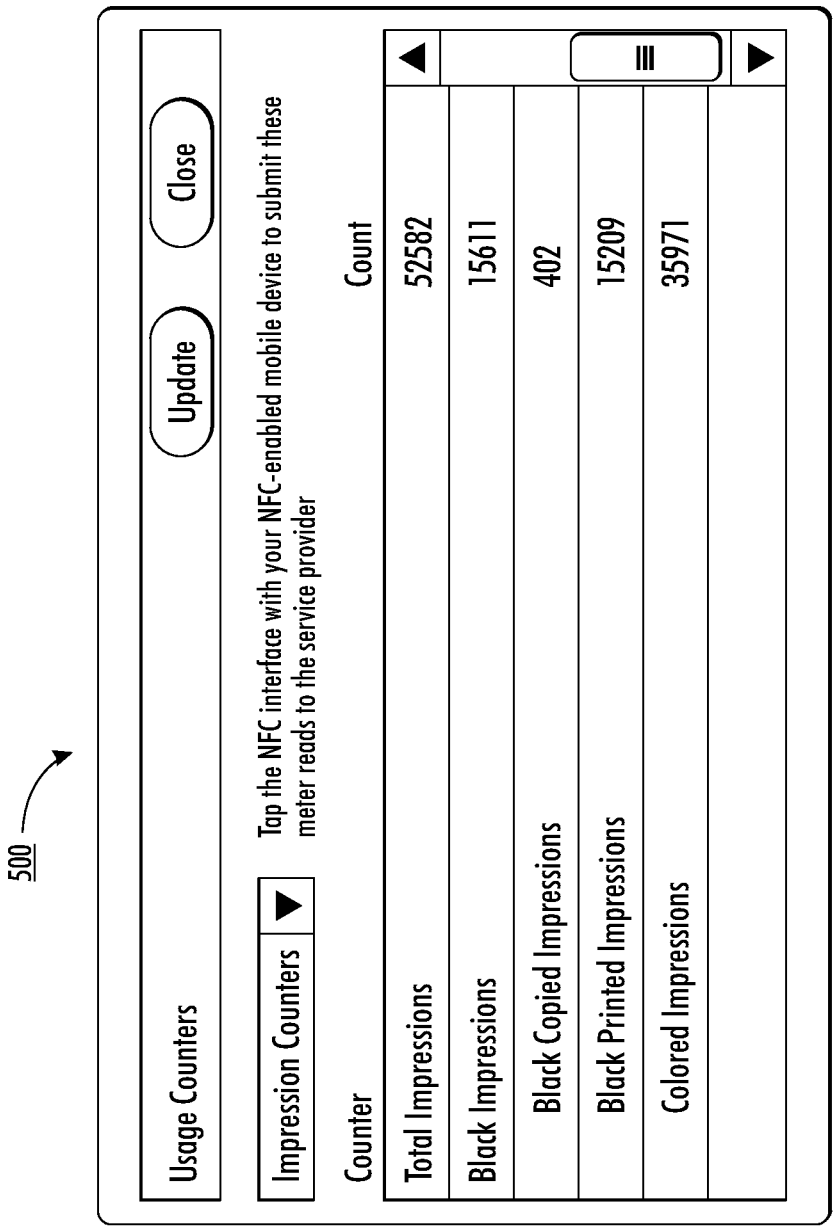
FIG. 5 is a schematic illustration of a graphical user interface of service provider multi-functional device.

Referring now to FIGS. 4A-4B, there is provided a flow diagram of a method 400 for exchanging data between an SPMFD (e.g., SPMFD 102 of FIG. 1) and an SPS (e.g., SPS 118 of FIG. 1) using NFC technology and mobile technology. As shown in FIG. 4, the method 400 begins with step 402 and continues with an optional step 404. In optional step 404, the SPMFD receives a user input to view information relating to the operations and/or characteristics thereof. Notably, in some embodiments, the SPMFD is a non-connected multi-functional device. As such, it is absent of a network interface and/or is not communicatively coupled to an SPS via a communications link established over a network, and therefore is not network accessible to the SPS.

Figure 8:
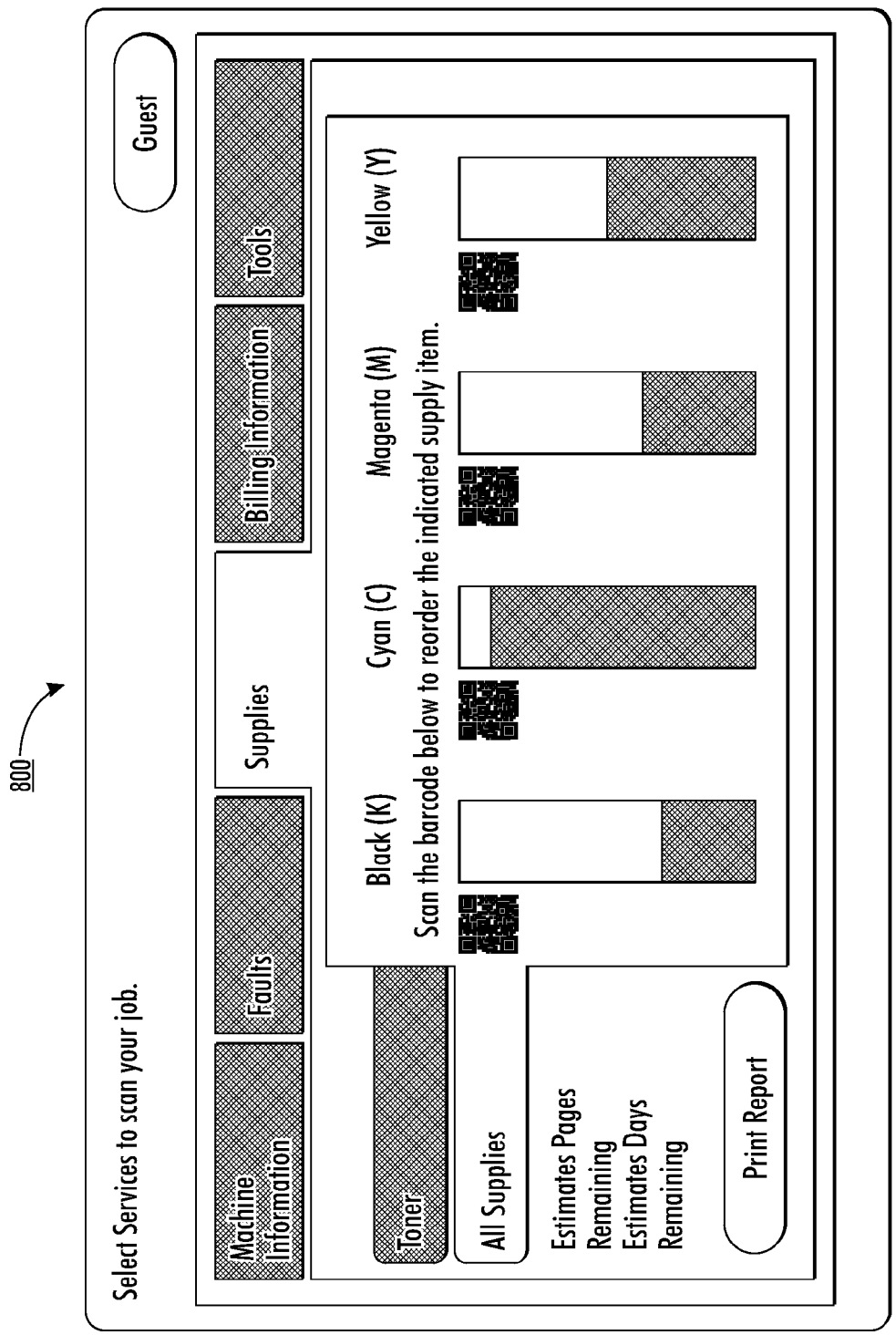
Figure 9:
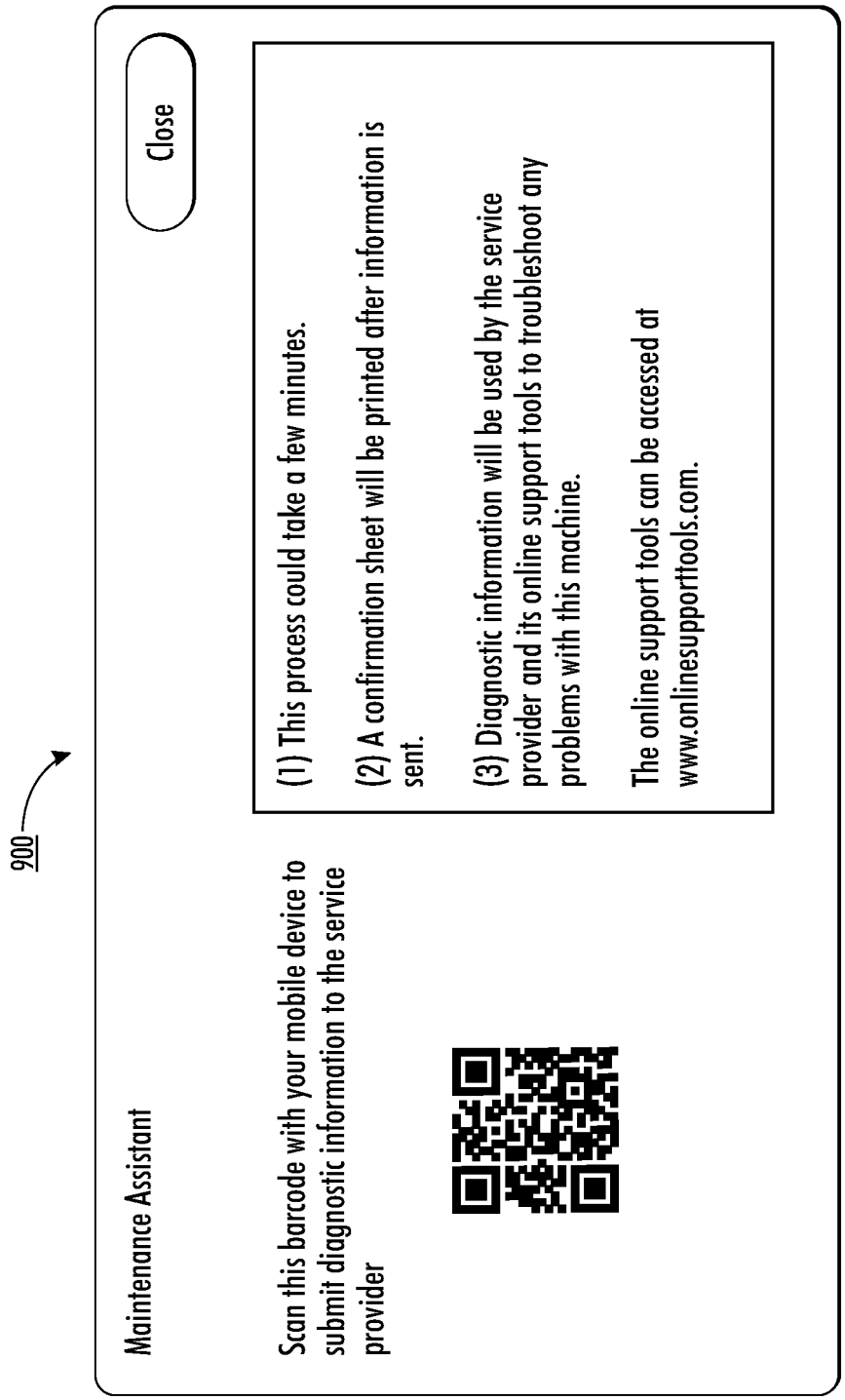

The user input of step 404 may be facilitated by a Graphical User Interface ("GUI") of the SPMFD which allows a user to select one or more functional categories for which information is to be viewed thereby. A schematic illustration of a GUI 800 is provided in FIG. 8. As shown in FIG. 8, the GUI 800 provides a means for the user to view various information, such as machine information, fault information, supply information, billing information and tool information. Embodiments are not limited in this regard. The information may include any type of information that is of interest to the user and/or a service provider.

In response to the user input of step 404, optional step 406 is performed where the information relating to the operations and/or characteristics can be optionally retrieved and displayed by the SPMFD to the user thereof This information can include, but is not limited to, information specifying a subset of a plurality of operational parameters that corresponds to the selected functional category(ies).

Instructions may also be displayed by the SPMFD. For example, in optional step 408, instructions are displayed that instruct the user to open an NFC software application (e.g., NFC application 254 of FIG. 2) installed on an MCD (e.g., MCD 104 of FIG. 1), and/or to place the MCD adjacent to an NFC interface (e.g., system interface 322 of FIG. 3) thereof. A schematic illustration of a GUI 500 displaying such information and instructions is provided in FIG. 5. Embodiments are not limited to the contents of GUI 500. Alternative embodiments may include GUIs comprising content that is the same as or similar to the content of GUIs 700, 800, 900 of FIGS. 7-9.

In a next optional step 410, actions are performed by the user for initiating a data exchanged between the MCD and the SPMFD. Such actions involve opening an NFC software application installed on the MCD and/or placing the MCD adjacent to the NFC interface of the SPMFD by the user thereof. Operations for opening an NFC software application are well known in the art, and therefore will not be described herein.

Prior to any data exchange, the user's identity can be verified by the SPMFD and/or the MCD. In this scenario, optional steps 412-420 may be performed. In step 412, authentication information (e.g., a username and/or a password) is requested from the user. The authentication information is then used to verify the user's identity, as shown by step 414. Methods for verifying a user's identity are well known in the art. Any such known or to be known method for verifying a user's identity can be used herein without limitation.

If the user's identity has not been verified [416:NO], then optional step 418 is performed where information is presented to the user indicating that her/his identity has not been verified, and therefore the devicet data is unable to be communicated from the SPMFD to the MCD. Subsequently, the method 400 ends or other processing is performed, as shown by step 420.

In contrast, if the user's identity has been verified [416: YES], then the method 400 continues with step 422. In step 422, the SPMFD dynamically generates a first data string. The first data string comprises a device identifier for the SPMFD and/or device data. The device identifier can include, but is not limited to, a serial number. The device data includes, pre-defined data or the data displayed in previous optional step 406 which is useful for billing purposes, supply ordering purposes, and/or fault diagnosis purposes. For example, the device data includes machine configurations information (e.g., scanner, number of paper trays, finisher, etc. . . . ), software/network information (e.g., an IP address, device settings and software versions), service activity information, supply usage information, a shipping address, and/or meter data. An example of a first data string is provided below.

SerialNumber="12345678910"&data="TotalImpressions=52582BlackImpressions=15611BlackCopiedImpressions=402BlackPrintedImpressions=15209ColoredImpressions=35971"&TSTAMP="6/13/2012 12:02:01AM"

As shown above, the first data string may also include a time stamp. Methods for generating time stamps and appending them to data strings are well known in the art, and therefore will not be described herein. Any known or to be known method can be used here without limitation.

Once the first data string has been dynamically generated, the SPMFD may optionally encrypt the first data string in step 423. Encryption is well known in the art, and therefore will not be described herein. Still, it should be appreciated that any known or to be known technique for encrypting data can be used herewith without limitation.

In a next step 424, the first data string is appended to data corresponding to a destination so as to form a second data string. The "destination data" may include, but is not limited to, a web address or URL for a maintenance service, a document management financial tracking service, or an item supplier. An example of a second data string is provided below.

http://www.serviceproviderwebservice.com&SerialNumber="12345678910"&data="TotalImpressions=52582BlackImpressions=15611BlackCopiedImpressions=402BlackPrintedImpressions=15209ColoredImpressions=35971"&TSTAMP="6/13/2012 12:02:01 AM"

As shown above the first data string is appended to the end of the URL. Embodiments are not limited in this regard. The first data string can alternatively be appended in front of the URL. Methods for appending data strings are well known in the art. Any known or to be known method for appending data strings may be used herein without limitation.

Upon completing step 424, the method 400 continues with step 425 of FIG. 4B. As shown in FIG. 4B, step 425 involves communicating the second data string from the SPMFD to the MCD via a near field communication. Near field communications are well known in the art, and therefore will not be described herein. The second data string is then processed at the MCD in step 426. The MCD processes the second data string to obtain the "destination data" (e.g., the URL) and/or the first data string therefrom. Notably, in some embodiments, the MCD does not perform any operations to decrypt the first data string if it was encrypted by the SPMFD. In such scenarios, the decryption of the first data string is performed by the SPS.

In response to the reception of the second data string, the MCD performs operations in step 428 for automatically launching a web browser (e.g., web browser 252 of FIG. 2) or a proprietary software application installed thereon. The MCD then accesses a computing device (e.g., computing device 108 of FIG. 1) of the SPS in step 430. This access is achieved using the software launched in previous step 428 and "destination data" (e.g., a URL). The "destination data" includes the destination data obtained from the second data string or other destination data which was pre-stored in a memory (e.g., memory 212 of FIG. 2) of the MCD.

After the computing device has been accessed by the MCD, step 432 is performed where the first data string is communicated from the MCD to the computing device of the SPMFD. At the computing device, the first data string may be decrypted if it was encrypted by the SPMFD, as shown by optional step 433. Subsequent to completing step 432 or 433, step 434 is performed where the computing device forwards the first data string to the proper sub-system of the SPS (e.g., a sub-system 112, 114 or 116 of FIG. 1). At the sub-system, the device identifier and/or the device data of the first data string is processed in a pre-defined manner, as shown by step 436. For example, if the device data includes meter data, then the sub-system uses the device data to generate a bill for the respective customer. If the device data includes fault code data, then the sub-system uses the device data to identify equipment faults. If the device data includes supply item usage data, then the sub-system uses the device data to place an order for the supply item.

The sub-system may generate and send a response message to the MCD in a next step 438. The response message may indicate that the data was successfully communicated and/or processed by the SPS. For example, the response message indicates that an item order (e.g., a toner order) is pending for the SPMFD (e.g., a printer or multi-functional device), or specifies repair instructions. The response message may also indicate that additional data needs to be obtained from the SPMFD. For example, the response message may request information specifying a shipping address. Thereafter, step 440 is performed where the method 400 ends or other processing is performed. The other processing can involve repeating steps 422-438 until all required data has been successfully communicated and/or processed by the SPS.

Figure 6A:
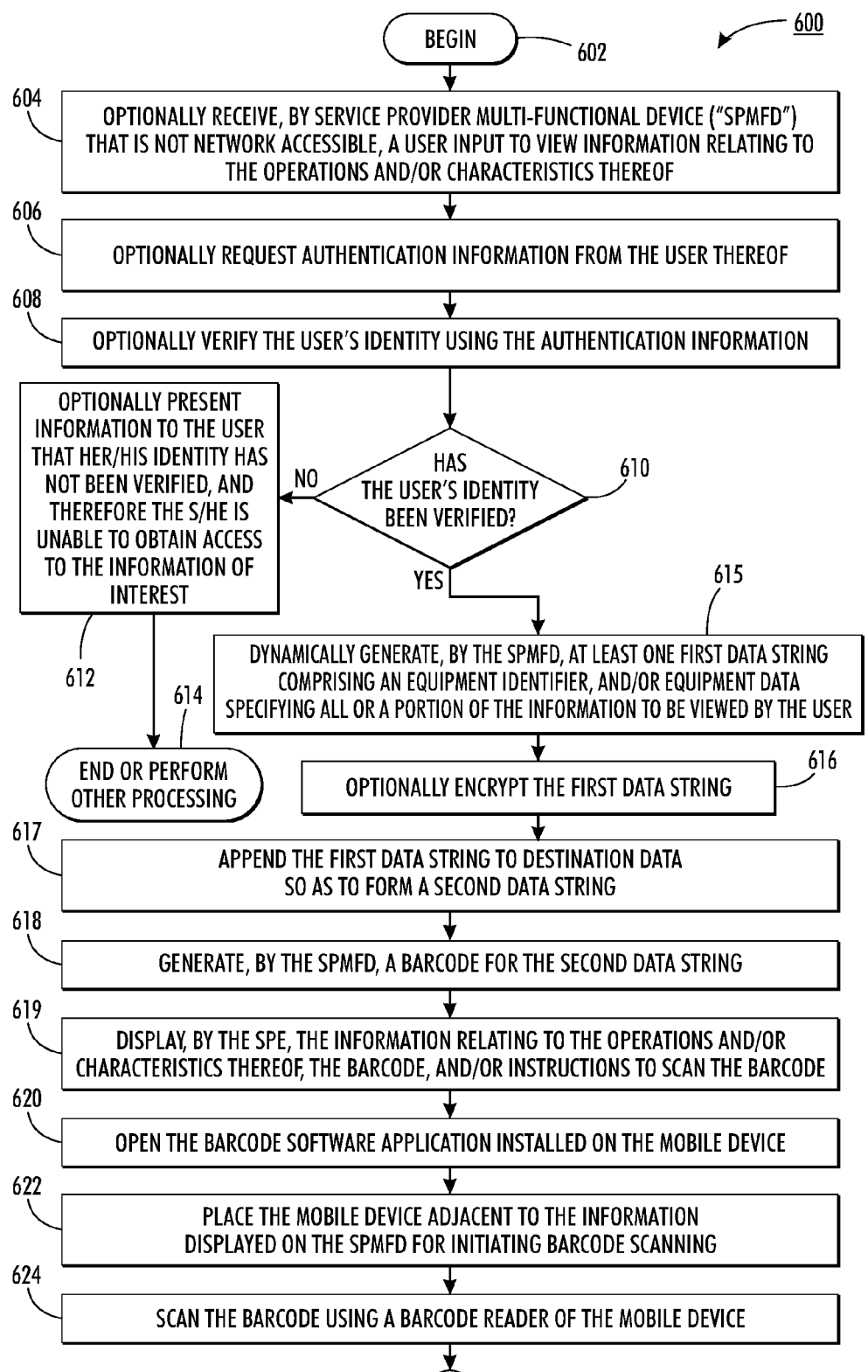
FIGS. 6A-6B collectively provide a flow diagram of a method for providing non-connected product data exchange via barcode and mobile technologies.
Figure 6B:
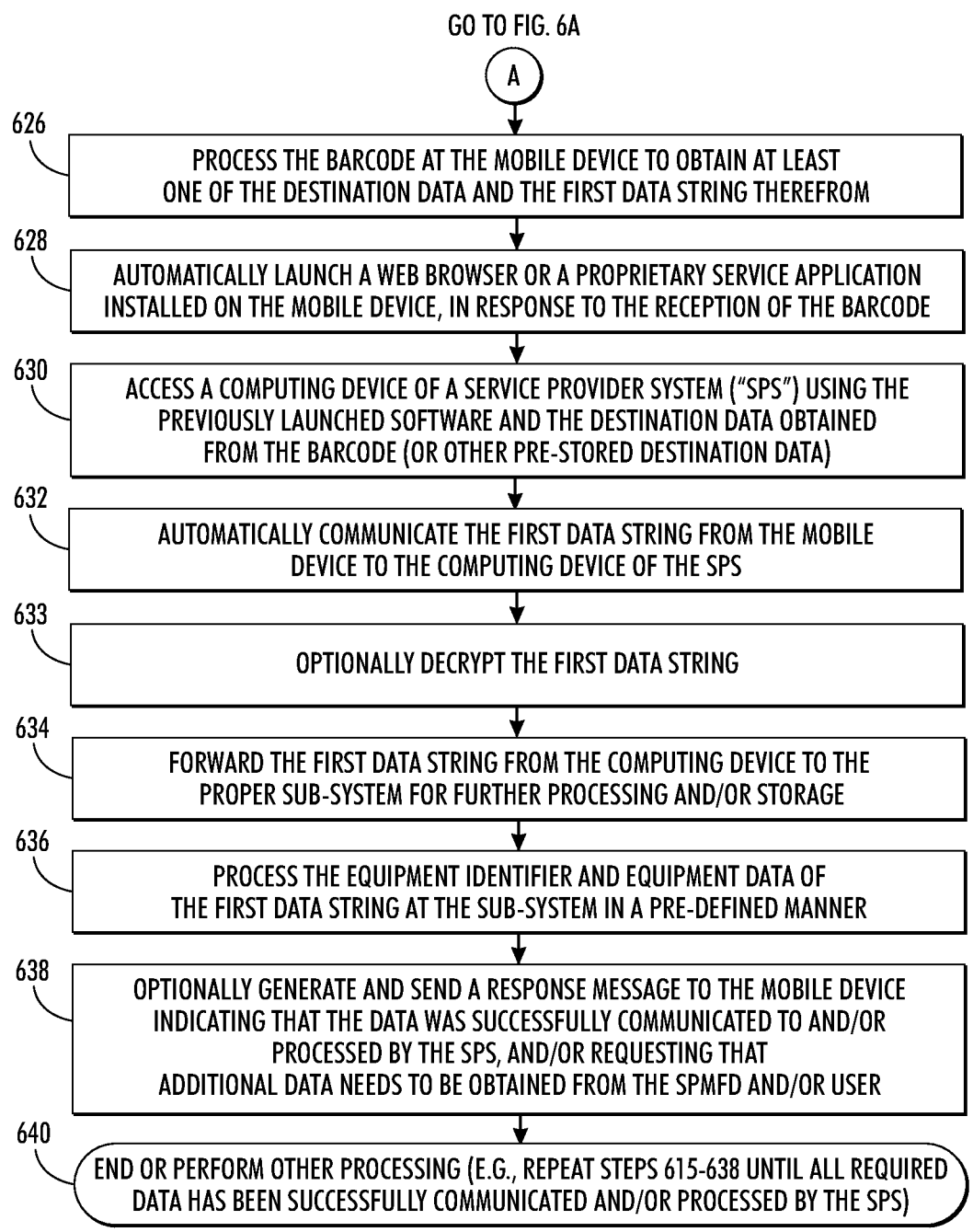
Figure 7:
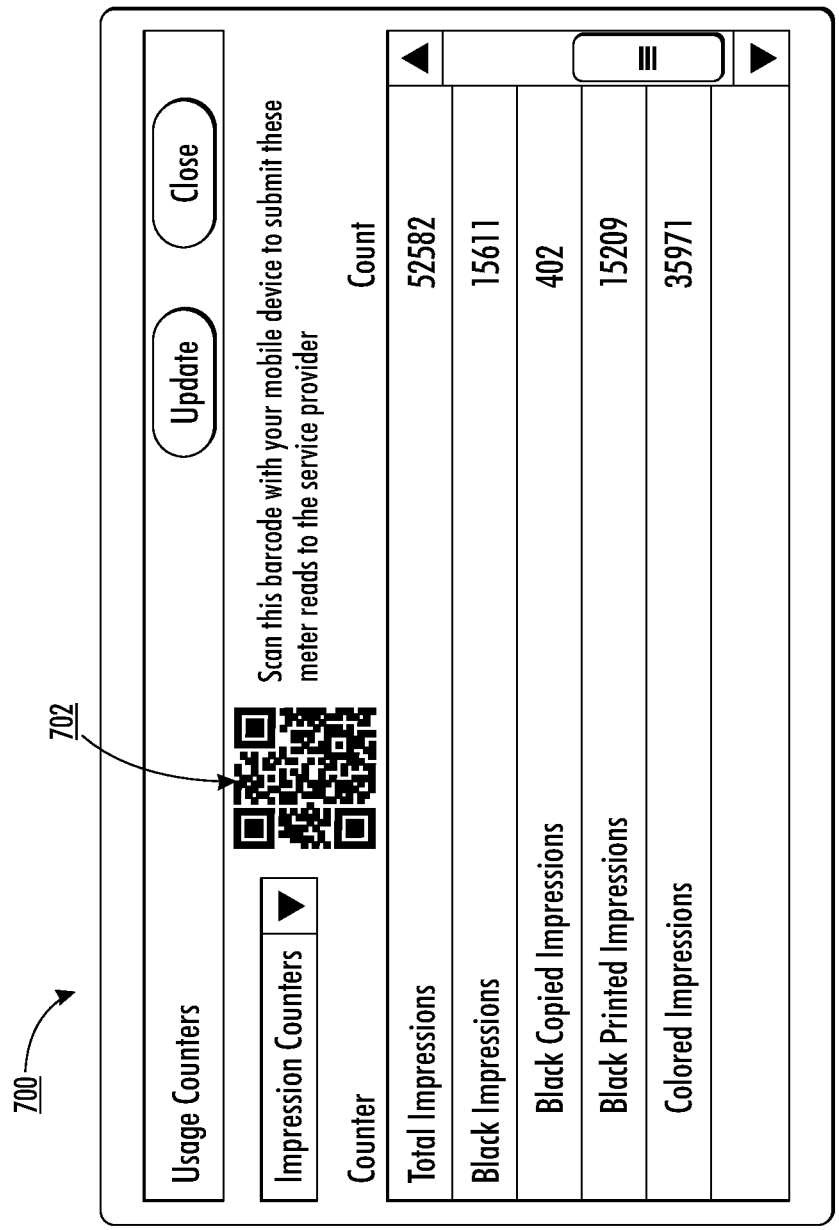
FIGS. 7-9 each provide a schematic illustration of a graphical user interface of service provider multi-functional device.

Referring now to FIGS. 6A-6B, there is provided a flow diagram of a method 600 for exchanging data between an SPMFD (e.g., SPMFD 102 of FIG. 1) and an SPS (e.g., SPS 118 of FIG. 1) using barcode technology and mobile technology. As shown in FIG. 6, the method 600 begins with step 602 and continues with an optional step 604. In optional step 604, the SPMFD receives a user input to view information relating to the operations and/or characteristics thereof. Notably, in some embodiments, the SPMFD is a non-connected multi-functional device. As such, it is absent of a network interface and/or is not communicatively coupled to the SPS via a communications link established over a network, and therefore is not network accessible to the SPS.

The user input of step 604 may be facilitated by a GUI of the SPMFD which allows a user to select one or more functional categories for which information is to be viewed thereby. A schematic illustration of a GUI 800 is provided in FIG. 8. As shown in FIG. 8, the GUI 800 provides a means for the user to view various information, such as machine information, fault information, supply information, billing information and tool information. Embodiments are not limited in this regard. The information may include any type of information that is of interest to the user and/or a service provider.

In response to the user input of step 604, the method 600 continues with optional steps 606-614 for verifying the user's identity. In this regard, step 606 involves requesting authentication information (e.g., a username and/or password) from the user. The authentication information is then used to verify the user's identity, as shown by step 608. Methods for verifying a user's identity are well known in the art. Any such known or to be known method for verifying a user's identity can be used herein without limitation.

If the user's identity has not been verified [610:NO], then optional step 612 is performed where information is presented to the user indicating that her/his identity has not been verified, and therefore she/he is unable to obtain access to the information of interest. Subsequently, the method 600 ends or other processing is performed, as shown by step 614.

In contrast, if the user's identity has been verified [610: YES], then the method 600 continues with step 615. In step 615, the SPMFD dynamically generates at least one first data string. The first data string comprises an equipment identifier for the SPMFD and/or device data specifying all or a portion of the information to be viewed by the user. The device identifier can include, but is not limited to, a serial number. The device data includes, but is not limited to, any data that is useful for billing purposes, supply ordering purposes, and/or fault diagnosis purposes. For example, the device data includes machine configurations information, software/network information, service activity information, supply usage information, a shipping address, and/or meter data. An example of a first data string is provided below.

SerialNumber="12345678910"&data="TotalImpressions= 52582BlackImpressions=15611BlackCopiedImpressions=402BlackPrintedImpressions=15209ColoredImpressions=35971"&TSTAMP="6/13/2012 12:02:01AM"

As shown above, the first data string may also include a time stamp. Methods for generating time stamps and appending them to data strings are well known in the art, and therefore will not be described herein. Any known or to be known method for generating timestamps and/or appending data strings can be used here without limitation Once the first data string has been dynamically generated, the SPMFD may optionally encrypt the data string in step 616. Encryption techniques are well known in the art, and therefore will not be described herein. Still, it should be appreciated that any known or to be known technique for encrypting data can be used herewith without limitation.

In a next step 617, the first data string is appended to data corresponding to a destination so as to form a second data string. The "destination data" may include, but is not limited to, a web address or URL for a maintenance service, a document management financial tracking service, or an item supplier. An example of a second data string is provided below.

http://www.serviceproviderwebservice.com&Serial Number="12345678910"&data="TotalImpressions= 52582BlackImpressions=15611BlackCopiedImpressions=402BlackPrintedImpressions=15209ColoredImpressions=35971"&TSTAMP="6/13/2012 12:02:01 AM"

As shown above, the first data string is appended to the end of the URL. Embodiments are not limited in this regard. The first data string can alternatively be appended in front of the URL. Methods for appending data strings are well known in the art, and therefore will not be described herein. Any known or to be known methods can be used here without limitation.

Upon completing step 617, the method 600 continues with step 618 where a barcode is generated by the SPMFD for the second data string. As known in the art, a barcode may comprise a two-dimensional matrix bar code representing certain information. A schematic illustration of an example of a barcode 702, in the case of a QR code, is provided in FIG. 7. Methods for generating barcodes are well known in the art, and therefore will not be described herein. Any known or to be known methods for generating barcodes can be used here without limitation. Still, it should be understood that such methods generally involve encoding operations for encoding data.

Thereafter, in step 619, the barcode is output on a readable medium by the SPMFD. For example, the barcode is displayed on a display screen of the SPMFD or printed on a substrate (e.g., a sheet of paper). The barcode may be output along with other information. The other information includes, but is not limited to, information relating to the operations and/or characteristics of the SPMFD, and/or instructions to scan the barcode. The barcode and other information can be displayed in a GUI of the SPMFD. Schematic illustrations of GUIs 700, 800, 900 comprising barcodes and other information are provided in FIGS. 7-9. Embodiments are not limited to the contents of GUIs 700, 800, 900. Alternative embodiments may include GUIs comprising none or a portion of the content contained in GUIs 700, 800, 900 of FIGS. 7-9. For example, an alternative embodiment of GUI 800 comprises a single barcode representation for all supply items or a portion of the supply items that need to be re-ordered. In such scenarios, a determination as to which supply items need to be re-ordered can be made by the SPMFD based on pre-defined threshold values (e.g., a supply item can only be re-ordered when X % thereof has been used).

In response to the display of the barcode, the user opens a barcode software application (e.g., barcode application 256 of FIG. 2) installed on the MCD. The user also places the MCD adjacent to the information displayed on the SPMFD for initiating barcode scanning, as shown by step 622. Next in step 624, the MCD performs operations to scan the barcode. Such barcode scanning operations are well known in the art, and therefore will not be described herein.

After scanning the barcode, the method 600 continues with step 626 of FIG. 6B. As shown in FIG. 6B, step 626 involves processing the barcode at the MCD to obtain the "destination data" (e.g., a URL) and/or first data string therefrom. This processing can involve, but is not limited to, decoding the barcode. Methods for decoding barcodes are well known in the art, and therefore will not be described herein. Any known or to be known method for decoding barcodes can be used here without limitation. Notably, in some embodiments, the MCD does not perform any operations to decrypt the first data string if it was encrypted by the SPMFD. In such scenarios, the decryption of the first data string is performed by the SPS.

In response to the reception of the barcode, the MCD performs operations in step 628 for automatically launching a web browser (e.g., web browser 252 of FIG. 2) or a proprietary software application installed thereon. The MCD then accesses a computing device (e.g., computing device 108 of FIG. 1) of the SPS in step 630. This access is achieved using the software launched in previous step 628 and the "destination data" (e.g., a URL). The "destination data" includes the destination data obtained from the second data string or other destination data which was pre-stored in a memory (e.g., memory 212 of FIG. 2) of the MCD.

After the computing device has been accessed by the MCD, step 632 is performed where the first data string is communicated from the MCD to the computing device of the SPMFD. At the computing device, the first data string may be decrypted if it was encrypted by the SPMFD, as shown by optional step 633. Subsequent to completing step 632 or 633, step 634 is performed where the computing device forwards the first data string to the proper sub-system of the SPS (e.g., a sub-system 112, 114 or 116 of FIG. 1). At the sub-system, the device identifier and/or the device data of the first data string is processed in a pre-defined manner, as shown by step 636. For example, if the device data includes meter data, then the sub-system uses the device data to generate a bill for the respective customer. If the device data includes fault code data, then the sub-system uses the device data to identify device faults. If the device data includes supply item usage data, then the sub-system uses the device data to place an order for the supply item.

The sub-system may generate and send a response message to the MCD in a next step 638. The response message may indicate that the data was successfully communicated and/or processed by the SPS. For example, the response message indicates that an item order (e.g., a toner order) is pending for the SPMFD (e.g., a printer or multi-functional device), or specifies repair instructions. The response message may also indicate that additional data needs to be obtained from the SPMFD and/or user. For example, a zip code (or other geographic data indicating the actual location of the device) specified in the device data is invalid as a result of transmission errors. As such, the SPS may request that the zip code (or other geographic data) be resent thereto from the SPMFD. Additionally or alternatively, the SPS can request that the user select a supply item of a plurality of supply items for which an order should be placed. Thereafter, step 640 is performed where the method 600 ends or other processing is performed. The other processing can involve repeating steps 615-638 until all required data has been successfully communicated and/or processed by the SPS.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for capturing operational information for a print device, comprising:

monitoring, by a processor of a print device located at a customer facility, a plurality of operational parameters of the print device, where each of the operational parameters corresponds to at least one of a plurality of different functional categories;

receiving, via a user interface of the print device, a first user selection that corresponds to a first functional category of the plurality of different functional categories;

retrieving, by the processor, a first subset of operational parameters that corresponds to the first functional category;

encoding, by the processor, data containing the first subset of operational parameters into a first barcode;

encoding, by the processor into the first barcode, first destination data specifying how to access a first destination resource to which the first subset of operational parameters is to be subsequently communicated from an intermediary device, where the first destination resource is associated with the first functional category and not a second functional category of the plurality of different functional categories;

causing, by the processor, the first barcode to be output via a readable medium such that the first barcode can be scanned by the intermediary device for provision to a service provider system, where the intermediary device and service provider system are not network accessible to each other;

receiving, via the user interface of the print device, a second user selection that corresponds to the second functional category of the plurality of different functional categories; and in response to the second user selection, dynamically generating by and outputting from the print device a second barcode different from the first barcode which comprises a second subset of operational parameters that corresponds to the second functional category and second destination data specifying how to access a second destination resource to which the second subset of operational parameters is to be subsequently communicated from the intermediary device, where the second destination resource is associated with the second functional category and not the first functional category.

2. The method according to claim 1, wherein the readable medium is a display screen on which the first and second barcodes can be displayed.

3. The method according to claim 1, wherein readable medium is a substrate on which the first and second barcodes can be printed.

4. The method according to claim 1, wherein
the first functional category comprises a machine configuration category,
the first subset of operational parameters comprises a print device identification code, a tray configuration parameter, a peripheral device identification code, and a print device setting, and the first destination data comprises a web address for a maintenance service.

5. The method according to claim 1, wherein
the first functional category comprises a meter read category,
the first subset of operational parameters comprises a number of impressions, and
the first destination data comprises a web address for a document management financial tracking service.

6. The method according to claim 1, wherein
the first functional category comprises a consumable item category,
the first subset of operational parameters comprises a toner level, and
the first destination data comprises a web address for a toner supplier.

7. The method according to claim 6, further comprising:
capturing, by the intermediary device, an image of the first barcode;
decoding, by the intermediary device, the first barcode;
transmitting, by the intermediary device, an electronic message comprising the toner level; and
receiving, by the intermediary device, a response from the toner supplier indicating that a toner order is pending for the print device.

8. The method according to claim 1, wherein
the first functional category comprises a maintenance function,
the first subset of the operational parameters comprises a fault code and at least one print setting, and
the first destination data comprises a web address for a maintenance service.

9. The method according to claim 8, further comprising:
capturing, by the intermediary device, an image of the first barcode;
decoding, by the intermediary device, the first barcode;
transmitting, by the intermediary device, an electronic message comprising the fault code and the print setting;
receiving, by the intermediary device, a response comprising repair instructions from the maintenance service.

10. A system, comprising:
a print device located at a customer facility and configured to
monitor a plurality of operational parameters thereof, where each of the operational parameters corresponds to at least one of a plurality of different functional categories;
receive a first user selection that corresponds to a first functional category of the plurality of different functional categories;
retrieve a first subset of operational parameters that corresponds to the first functional category;
encode data containing the first subset of operational parameters into a first barcode;
encode into the first barcode first destination data specifying how to access a first destination resource to which the first subset of operational parameters is to be subsequently communicated from an intermediary device, where the first destination resource is associated with the first functional category and not a second functional category of the plurality of different functional categories; and
cause the first barcode to be output via a readable medium such that the first barcode can be scanned by the intermediary device for provision to a service provider system, where the intermediary device and service provider system are not network accessible to each other;
receive a second user selection that correspond to the second functional category of the plurality of different functional categories; and
in response to the second user selection, dynamically generating by and outputting a second barcode different from the first barcode which comprises a second subset of operational parameters that corresponds to the second functional category and second destination data specifying how to access a second destination resource to which the second subset of operational parameters is to be subsequently communicated from the intermediary device, where the second destination resource is associated with the second functional category and not the first functional category.

11. The system according to claim 10, wherein the readable medium is a display screen on which the first and second barcodes can be displayed.

12. The system according to claim 10, wherein readable medium is a substrate on which the first and second barcodes can be printed.

13. The system according to claim 10, wherein
the first functional category comprises a machine configuration category,
the first subset of operational parameters comprises a print device identification code, a tray configuration parameter, a peripheral device identification code, and a print device setting, and
the first destination data comprises a web address for a maintenance service.

14. The system according to claim 10, wherein
the first functional category comprises a meter read category,
the first subset of operational parameters comprises a number of impressions, and
the first destination data comprises a web address for a document management financial tracking service.

15. The system according to claim 10, wherein
the first functional category comprises a consumable item category, the first subset of operational parameters comprises a toner level, and the first destination data comprises a web address for a toner supplier.

16. The system according to claim 15, wherein the intermediary device is configured to
capture an image of the first barcode,
decode the first barcode,
transmit an electronic message comprising the toner level, and
receive a response from the toner supplier indicating that a toner order is pending for the print device.

17. The system according to claim 10, wherein
the first functional category comprises a maintenance function,
the first subset of the operational parameters comprises a fault code and at least one print setting, and
the first destination data comprises a web address for a maintenance service.

18. The system according to claim 17, wherein the intermediary device is configured to
capture an image of the first barcode,
decode the first barcode,
transmit an electronic message comprising the fault code and the print setting, and
receive a response comprising repair instructions from the maintenance service.

19. A method for capturing operational information for an electronic device, the method comprising:
monitoring, by a processor of the electronic device located at a customer facility, a plurality of operational parameters of the electronic device, where each of the operational parameters corresponds to at least one of a plurality of different functional categories;
receiving, via a user interface of the electronic device, a user selection that corresponds to a first functional category of the plurality of different functional categories;
retrieving, by the processor, a first subset of operational parameters that corresponds to the first functional category;
encoding, by the processor, data containing the first subset of operational parameters into a first barcode;
encoding, by the processor into the first barcode, first destination data specifying how to access a first destination resource to which the first subset of operational parameters is to be subsequently communicated from an intermediary device, where the first destination resource is associated with the first functional category and not a second functional category of the plurality of different functional categories;
causing, by the processor, the first barcode to be output via a readable medium so that the first barcode can be scanned by an intermediary device for provision to a service provider system, where the intermediary device and service provider system are not network accessible to each other;
in response to the second user selection, dynamically generating by and outputting from the print device a second barcode different from the first barcode which comprises a second subset of operational parameters that corresponds to the second functional category and second destination data specifying how to access a second destination resource to which the second subset of operational parameters is to be subsequently communicated from the intermediary device, where the second destination resource is associated with the second functional category and not the first functional category.

* * * * *